US008265824B2

(12) United States Patent
Oishi et al.

(10) Patent No.: US 8,265,824 B2
(45) Date of Patent: Sep. 11, 2012

(54) AUTOWIPER CONTROLLER

(75) Inventors: Tatsuo Oishi, Hamamatsu (JP); Tomoyuki Ohata, Tokyo (JP)

(73) Assignees: Niles Co., Ltd., Tokyo (JP); Suzuki Motor Corporation, Shizuoka (JP)

( * ) Notice: Subject to any disclaimer, the term of this patent is extended or adjusted under 35 U.S.C. 154(b) by 301 days.

(21) Appl. No.: 12/783,292

(22) Filed: May 19, 2010

(65) Prior Publication Data
US 2010/0299025 A1 Nov. 25, 2010

(30) Foreign Application Priority Data
May 20, 2009 (JP) ................................. 2009-122460

(51) Int. Cl.
*G06F 7/00* (2006.01)
(52) U.S. Cl. ............................ 701/36; 318/483; 340/602
(58) Field of Classification Search .................... 701/36; 318/483, 444; 340/602
See application file for complete search history.

(56) References Cited

U.S. PATENT DOCUMENTS

| | | | | |
|---|---|---|---|---|
| 5,453,670 A * | 9/1995 | Schaefer | | 318/444 |
| 6,084,519 A * | 7/2000 | Coulling et al. | | 340/602 |
| 6,118,383 A * | 9/2000 | Hegyi | | 340/602 |
| 6,175,205 B1 * | 1/2001 | Michenfelder et al. | | 318/444 |
| 6,313,457 B1 * | 11/2001 | Bauer et al. | | 250/214 C |
| 6,373,263 B1 * | 4/2002 | Netzer | | 324/665 |
| 6,469,291 B2 * | 10/2002 | Bauer et al. | | 250/214 C |
| 6,657,410 B1 * | 12/2003 | Berger et al. | | 318/483 |
| 7,533,718 B2 * | 5/2009 | Straub | | 165/202 |
| 2003/0183752 A1 * | 10/2003 | Kobayashi et al. | | 250/222.2 |
| 2004/0178760 A1 * | 9/2004 | Kobayashi et al. | | 318/483 |
| 2005/0285557 A1 * | 12/2005 | Morishita | | 318/444 |
| 2006/0041352 A1 * | 2/2006 | Morishita | | 701/36 |
| 2011/0163866 A1 * | 7/2011 | Ghannam et al. | | 340/449 |
| 2012/0062163 A1 * | 3/2012 | Morishita et al. | | 318/483 |

FOREIGN PATENT DOCUMENTS
JP 2006007936 A 1/2006
* cited by examiner

*Primary Examiner* — Drew Brown
(74) *Attorney, Agent, or Firm* — Roylance, Abrams, Berdo & Goodman, L.L.P.

(57) ABSTRACT

First and second temperature check portions 7 and 8 determine whether an ambient temperature T1 is lower than 20° C. or not, whether an external surface temperature T2 of a windshield S is lower than 25° C. or not and whether a temperature difference (T2−T1) is lower than 20° C. or not, and a weather condition check portion 9 determines whether a condition that condensation occurs over the windshield S is met or not based on results of the checks. A wiper control portion 10 controls a driving operation of a wiper W based on a rainfall state checked by a low sensitivity rainfall check portion 5 when the condition that the condensation occurs is met, and controls the driving operation of the wiper W based on a rainfall state checked by a high sensitivity rainfall check portion 4 when a condition that the condensation does not occur is met.

4 Claims, 6 Drawing Sheets

AUTOWIPER CONTROLLER

CROSS-REFERENCE TO RELATED APPLICATION

This application is based on and claims priority under 35 U.S.C. §119 from Japanese Patent Application No. 2009-122460 filed on May 20, 2009.

BACKGROUND

1. Technical Field

The present invention relates to an autowiper controller for a vehicle which automatically actuates a wiper in the rain.

2. Description of the Related Art

There is an autowiper controller for automatically actuating a wiper when it rains during a running operation of a vehicle.

In order to detect a rainfall, a raindrop detecting surface is set to a windshield to utilize a change in a reflectance of a light when a waterdrop adheres to the raindrop detecting surface.

In other words, an infrared light is irradiated from a light emitting device onto the raindrop detecting surface, for example, and a reflected light is received by a light receiving device to determine a state of a rainfall based on a degree of a reduction in a quantity of receipt of a light or a manner of a temporal change.

As shown in FIG. 6, a change in a light receiving quantity signal sent from the light receiving device in the case in which general raindrops adhere to the raindrop detecting surface is once reduced rapidly for 2 msec, for example, and is then returned into an increasing direction and tends to be stabilized, and a decrease in a reflectance is comparatively small, and therefore, a change in a quantity of receipt of a light is not great, that is, approximately 3%.

This depends on the fact that a raindrop colliding with a windshield has a shape changed by a surface tension thereof as is also indicated in JP-A-2006-7936.

The raindrop detecting surface is set to have a small area in order to prevent a field of view from being disturbed. For this reason, conventionally, it is necessary to carry out a detection with a high sensitivity in order to perform a proper autowiper control. In a conventional autowiper controller, therefore, a decrease of 1.5% in a quantity of receipt of a light is set to be a threshold of the raindrop detection, for example.

At night or early in the morning in which a temperature is low, a phenomenon in which condensation occurs over a windshield appears. The phenomenon depends on the fact that a moisture in the air is solidified over an external surface of the cold windshield and thus becomes dewy as a minute waterdrop.

A speed of a change in a quantity of receipt of a light reflected from a raindrop detecting surface in the condensation process is lower than that in the case in which a raindrop adheres. However, a quantity of small waterdrops which adhere is increased to reach the whole raindrop detecting surface. For this reason, a decrease in a quantity of receipt of a light with a progress of condensation features to be increased more greatly as compared with the case in which the raindrop adheres.

The progress of the condensation is slow and the adhering waterdrops are not recognized by eyes of a driver to some extent. If a wiper repetitively carries out wiping over the windshield frequently with a small change in the quantity of receipt of a light, however, the driver feels troublesome.

In other words, there is a tendency that the driver generally wants to immediately wipe away the raindrop adhering to the windshield and desires to wipe away the condensation of the windshield at a great interval.

SUMMARY

In consideration of the problems of the related art, accordingly, it is an object of the invention to provide an autowiper controller which prevents condensation over an external surface of a windshield from being unnecessarily wiped away while ensuring to wipe a raindrop on the windshield away with a high sensitivity.

The inventors studied an environmental condition in the case in which condensation occurs over an external surface of a windshield and found that the condensation is apt to occur only when an ambient temperature, a temperature of the external surface of the windshield and a difference between the ambient temperature and the temperature of the external surface of the windshield meet predetermined conditions, and the condensation occurs if all of the conditions are met.

According to a first aspect of the invention, there is provided an autowiper controller including:

a raindrop detecting portion for optically detecting a raindrop adhering to a windshield of a vehicle;

a high sensitivity rainfall check portion for checking a rainfall state with a high sensitivity based on an output of the raindrop detecting portion;

a low sensitivity rainfall check portion for checking the rainfall state with a low sensitivity based on the output of the raindrop detecting portion;

ambient temperature detector for detecting an ambient temperature;

surface temperature detector for detecting an external surface temperature of the windshield;

a first temperature check portion for determining whether the ambient temperature is lower than a first set value or not;

a second temperature check portion for determining whether the external surface temperature of the windshield is lower than a second set value or not and whether a difference between the ambient temperature and the external surface temperature of the windshield is smaller than a third set value or not;

a weather condition check portion for determining whether a condition that condensation occurs over the windshield is met or not based on a result of the check by the first temperature check portion and a result of the check by the second temperature check portion; and a wiper control portion for controlling a driving operation of a wiper based on a rainfall state checked by the low sensitivity rainfall check portion when the condition that the condensation occurs over the windshield is met, and for controlling the driving operation of the wiper based on the rainfall state checked by the high sensitivity rainfall check portion when the condition that the condensation occurs is not met on the basis of a result of the check by the weather condition check portion.

According to a second aspect of the invention, there is provided the autowiper controller as set forth in the first aspect, wherein the weather condition check portion determines that the condition for the occurrence of the condensation over the windshield is not met, when a rainfall situation check portion for checking a basic rainfall state determines a rainfall.

According to a third aspect of the invention, there is provided the autowiper controller as set forth in the first or second aspect, further including:

a temperature sensor attached to the windshield, wherein the ambient temperature detector sets, as the ambient temperature, a temperature detected by the temperature sensor immediately after an ON operation of an ignition switch.

According to a fourth aspect of the invention, there is provided the autowiper controller as set forth in the third aspect, wherein the surface temperature detector sets, as the external surface temperature of the windshield, a temperature detected by the temperature sensor every certain time after the ON operation of the ignition switch.

BRIEF DESCRIPTION OF THE DRAWINGS

A general architecture that implements the various features of the invention will now be described with reference to the drawings. The drawings and the associated descriptions are provided to illustrate embodiments of the invention and not limited the scope of the invention.

DETAILED DESCRIPTION

Various embodiments according to the invention will be described hereinafter with reference to the accompanying drawings.

An embodiment according to the invention will be described below in detail.

Figure 1:
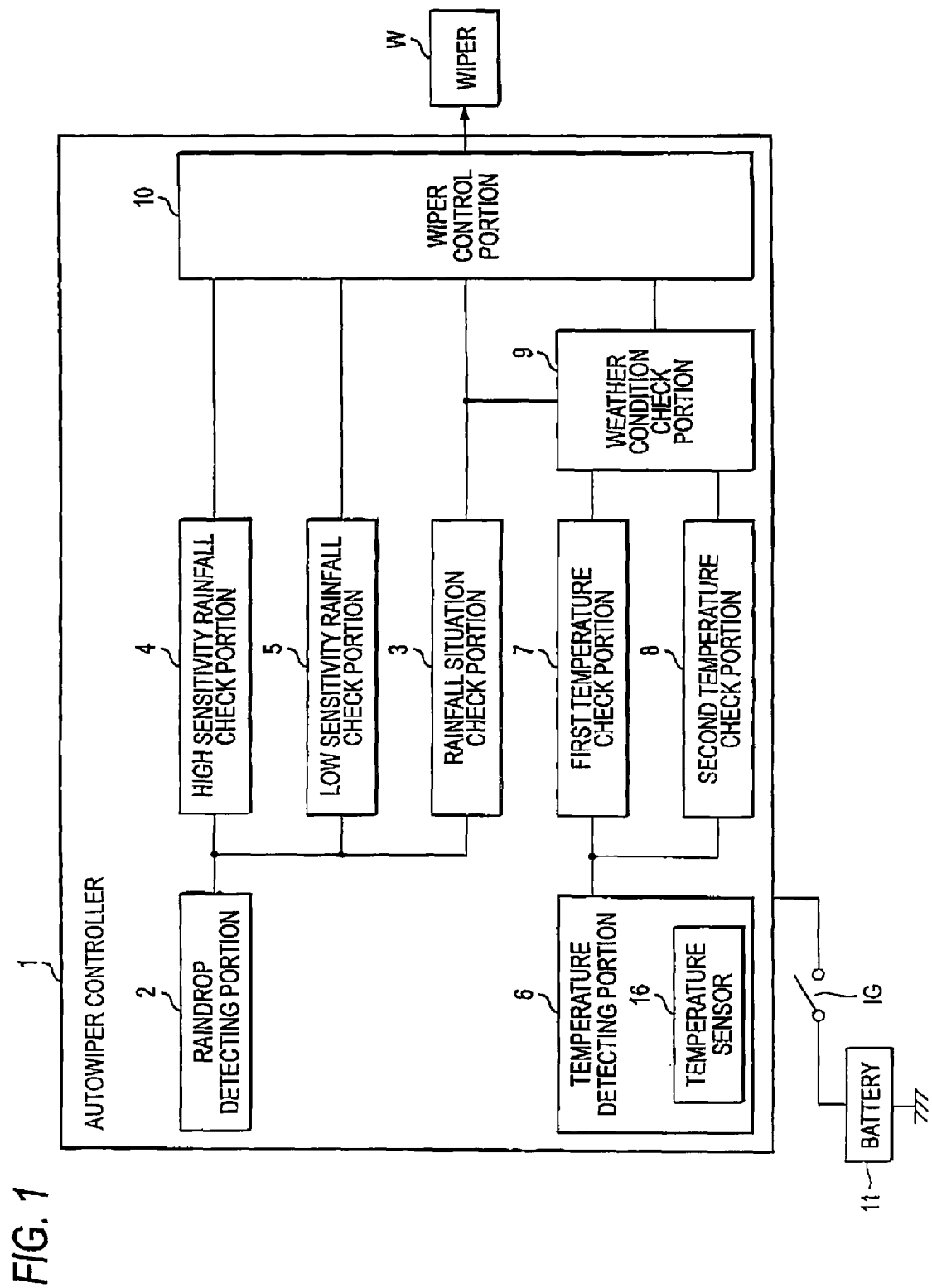
FIG. 1 is a block diagram showing a structure according to an embodiment.

FIG. 1 is a block diagram showing a structure of an autowiper controller according to the embodiment.

An autowiper controller 1 includes a rainfall situation check portion 3, a high sensitivity rainfall check portion 4 and a low sensitivity rainfall check portion 5 which are connected in parallel with a raindrop detecting portion 2, respectively.

Moreover, a first temperature check portion 7 and a second temperature check portion 8 are connected in parallel with a temperature detecting portion 6 for detecting a temperature of a windshield.

Furthermore, there is provided a weather condition check portion 9 which is connected to the rainfall situation check portion 3, the first temperature check portion 7 and the second temperature check potion 8, and the weather condition check portion 9, the rainfall situation check portion 3, the high sensitivity rainfall check portion 4 and the low sensitivity rainfall check portion 5 are connected to a wiper control portion 10.

The autowiper controller 1 is started to be actuated by a power supply of a battery 11 through an ON operation of an ignition switch IG.

Figure 2:
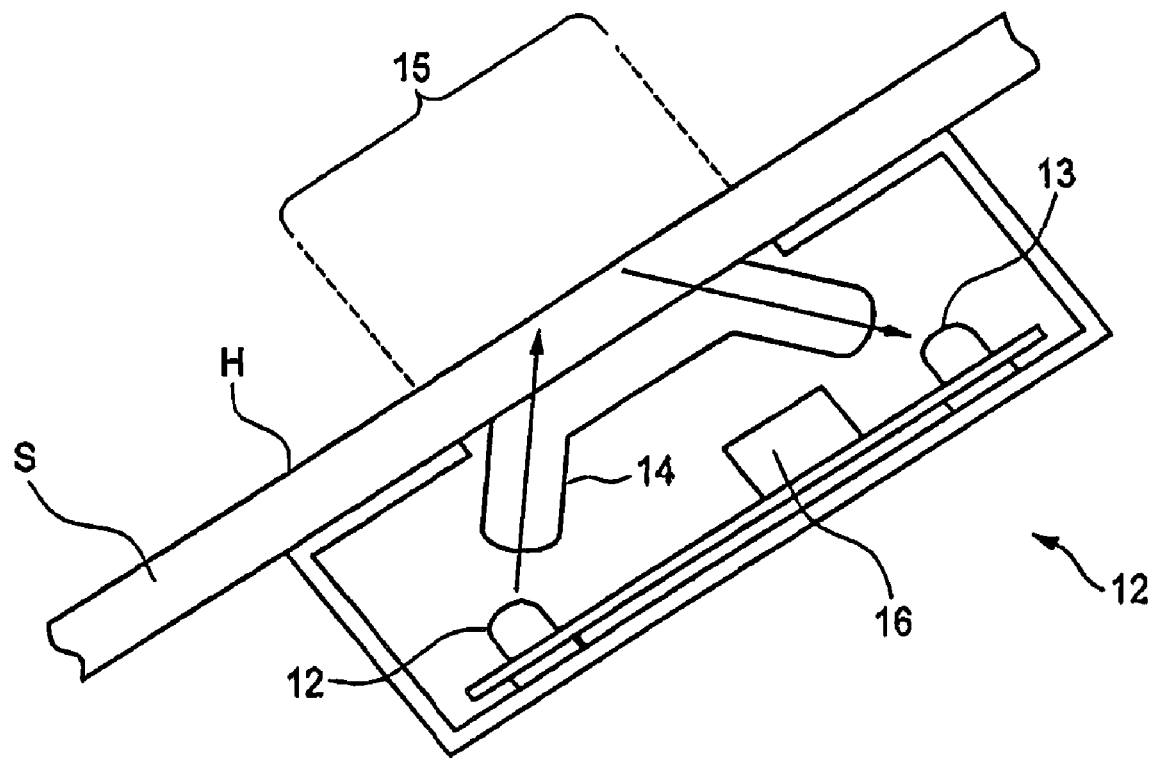
FIG. 2 is a view showing a structure of a raindrop detecting portion.

For example, as shown in FIG. 2, the raindrop detecting portion 2 is well-known, and includes a light emitting device 12 such as an infrared LED and a light receiving device 13 such as a photodiode and serves to receive, through the light receiving device 13, a light obtained by a reflection of a light emitted from the light emitting device 12 to a raindrop detecting surface 15 set to a windshield S and to output a light receiving quantity signal. A prism 14 is stuck to the windshield S. The prism 14 serves to lead the light emitted from the light emitting device 12 to the raindrop detecting surface 15 and to effectively collect the light reflected by the raindrop detecting surface into the light receiving device 13.

The rainfall situation check portion 3 is well-known and disclosed in JP-A-2006-7936 Publication, for example, and serves to detect a change in 1 msec of an adhering situation for each comparatively large granular raindrop by setting, as a threshold, a decrease of 1.5% in a quantity of receipt of a light, for example, thereby determining whether a rainfall state is brought or not.

The high sensitivity rainfall check portion 4 serves to observe a change in the quantity of receipt of a light at an interval of 1 sec and to set a decrease of 1.5% as a threshold, thereby detecting a rainfall state of a comparatively small particle such as a drizzle.

The low sensitivity rainfall check portion 5 serves to observe the change in the quantity of receipt of a light at an interval of 30 sec and to set a decrease of 15% as a threshold, thereby detecting condensation over the windshield S.

The rainfall situation check portion 3, the high sensitivity rainfall check portion 4 and the low sensitivity rainfall check potion 5 read the light receiving quantity signal from the raindrop detecting portion 2 at an interval of 500 µsec, for example, and carry out check processings at the same time with each other, respectively.

The temperature detecting portion 6 can utilize a temperature sensor 16 for a temperature compensation in each device provided in the raindrop detecting portion 2, for example. The raindrop detecting portion 2 is provided additionally on the windshield S at an inside of a vehicle compartment. Therefore, an output of the temperature sensor 16 can be substantially considered to be a temperature of an external surface H of the windshield S.

The first temperature check portion 7 determines whether or not the ambient temperature is lower than 20° C. which is a first set value.

The first temperature check portion 7 sets, as the ambient temperature, a temperature detected by the temperature sensor 16 immediately after a starting operation of an engine which turns ON the ignition switch IG and compares the ambient temperature with the first set value. The reason is as follows. Immediately after the engine is started, a temperature in a vehicle compartment is equal to the temperature of the external surface H of the windshield S, and therefore, is considered to be equal to the ambient temperature.

The second temperature check portion 8 determines whether or not the temperature of the external surface H of the windshield S is lower than 25° C. which is a second set value every certain time immediately after the ignition switch IG is turned ON, and furthermore, determines whether or not a rise in the temperature of the external surface H of the windshield S (a difference from the ambient temperature) every certain time is lower than 20° C. which is a third set value. The reason is as follows. The temperature in the vehicle compartment is raised due to a presence of a passenger or an actuation of an air conditioner or warm air is directly blown so that the temperature of the external surface H of the windshield S is changed after a vehicle starts a running operation.

The weather condition check portion 9 determines a possibility of an occurrence of condensation over the windshield S based on the rainfall state checked by the rainfall situation check portion 3, the ambient temperature state checked by the first temperature check portion 7 and the difference between the ambient temperature and the temperature of the external surface H of the windshield S every certain time which is checked by the second temperature check portion 8.

In other words, when all of four conditions are met, that is, the ambient temperature is lower than 20° C., the temperature of the windshield S is lower than 25° C., the difference between the ambient temperature and the temperature of the external surface H of the windshield S is smaller than 20° C. and the rainfall state is not brought, it is determined that the condensation might occur over the windshield S.

The condition that the rainfall state is not brought is set for the following reason. More specifically, the condensation can be prevented from being caused by a condensation in a wet state with a raindrop, and wiping is slowly carried out through a result of the check by the low sensitivity wiping when there is a possibility that the condensation might occur as will be described below. Therefore, it is impossible to meet a demand for a driver to immediately carry out the wiping when the raindrop adheres to the windshield S.

The wiper control portion 10 fundamentally controls a motor of a wiper W based on a result of the check by the rainfall situation check portion 3 and controls the motor of the wiper W based on the rainfall state checked by the low sensitivity rainfall check portion 5 when there is a possibility that the condensation might occur through a result of the check by the weather condition check portion 9. Hereinafter, the wiper W will be indicated with the motor omitted for simplicity.

When there is no possibility that the condensation might occur, the wiper control portion 10 controls the wiper W based on the rainfall state checked by the rainfall situation check portion 3 and the high sensitivity rainfall check portion 4.

Figure 3:
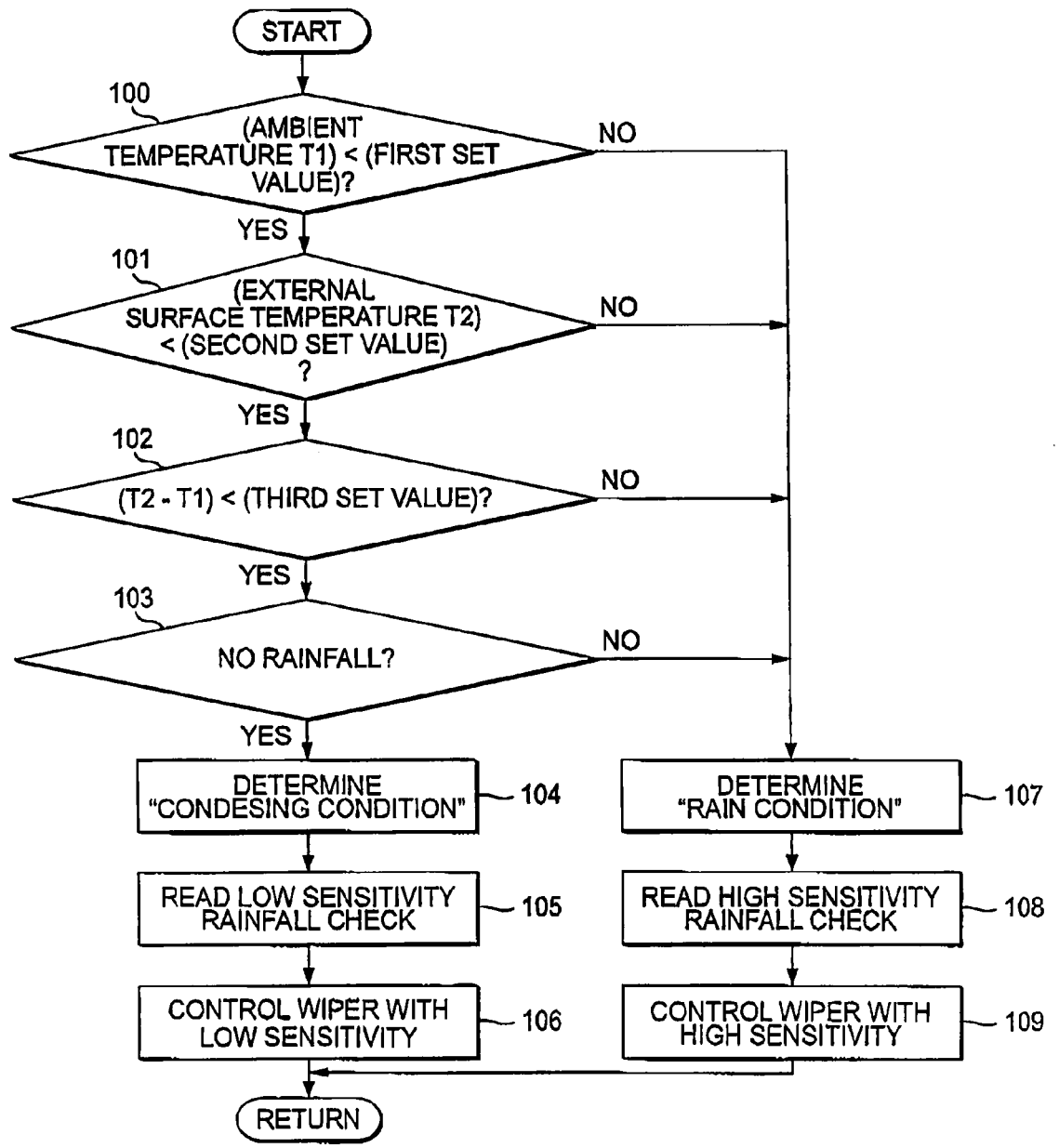
FIG. 3 is a flowchart showing a flow of a control according to the embodiment.

FIG. 3 is a flowchart showing a flow of a control of the autowiper controller having the structure described above.

The control flow is started when the ignition switch IG of a vehicle is turned ON, and is repeated at a predetermined time interval.

It is assumed that the rainfall situation check portion 3, the high sensitivity rainfall check portion 4 and the low sensitivity rainfall check portion 5 carry out check processings at the same time with each other as described above, and results are read at necessary predetermined steps.

First of all, at Step 100, the weather condition check portion 9 checks a result of the check for an ambient temperature through the first temperature check portion 7.

When an ambient temperature T1 is lower than a first set value (20° C.), the processing proceeds to Step 101 in which the weather condition check portion 9 checks a result of the check for an external surface temperature of the windshield S through the second temperature check portion 8.

When an external surface temperature T2 of the windshield S is lower than a second set value (25° C.), the processing proceeds to Step 102 in which the weather condition check portion 9 further checks a result of the check related to a difference between the ambient temperature T1 checked by the second temperature check portion 8 and the external surface temperature T2 of the windshield S (a raised temperature of the external surface H of the windshield S).

When the temperature difference (T2−T1) is smaller than a third set value (20° C.), the processing proceeds to Step 103.

At the Step 103, the weather condition check portion 9 checks a result of the check by the rainfall situation check portion 3.

When a rainfall situation is "no rainfall", the weather condition check portion 9 determines that the condensation might occur over the windshield S and outputs a "condensation condition" signal to the wiper control portion 10 at Step 104.

At subsequent Step 105, the wiper control portion 10 selects the low sensitivity rainfall check portion 5 corresponding to the "condensation condition" and reads a result of the check.

At Step 106, then, the wiper W is controlled with a low sensitivity in accordance with a result of the check by the low sensitivity rainfall check portion 5.

Figure 4:
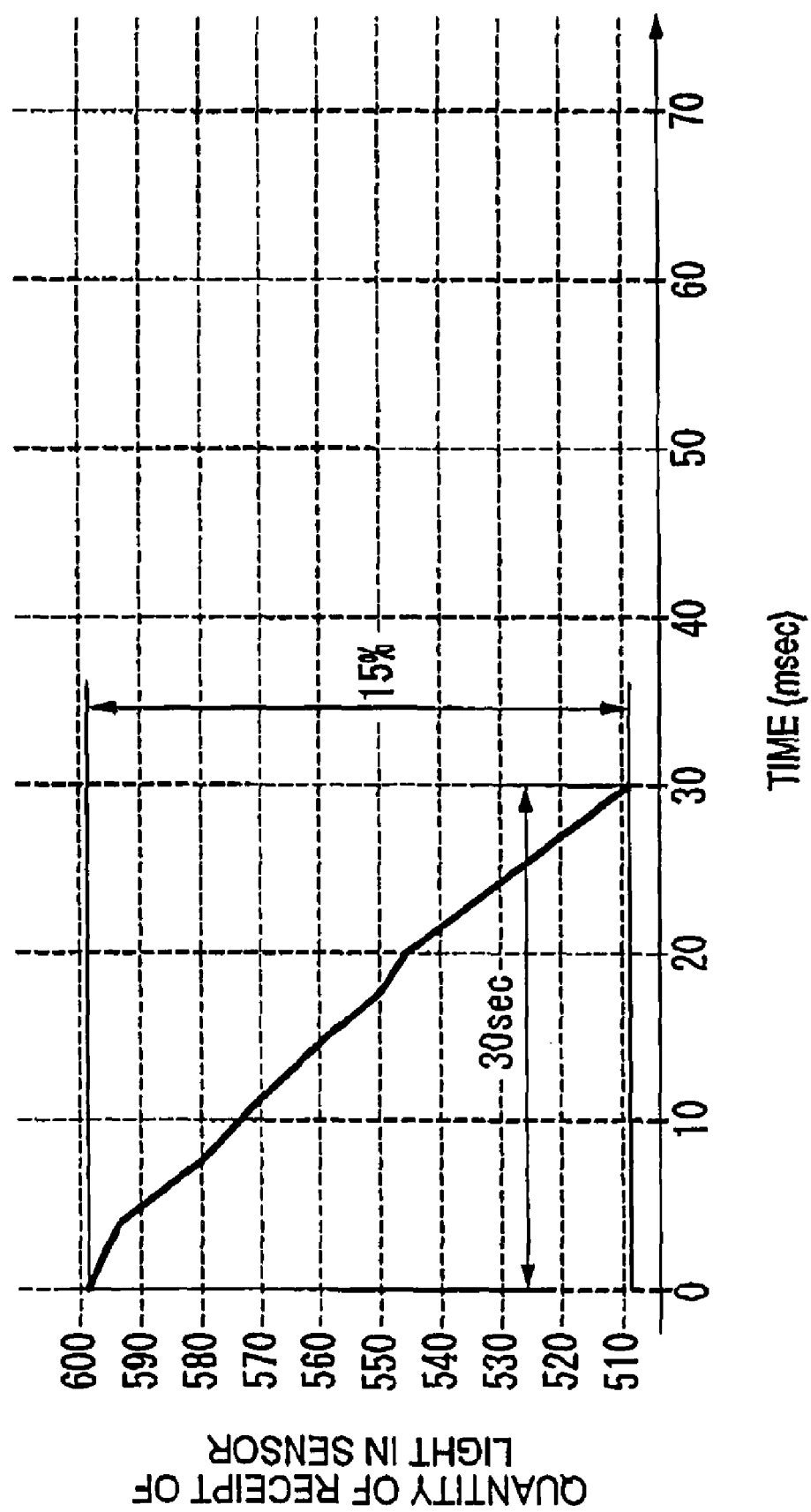
FIG. 4 is a chart showing an example of a result of the check by a low sensitivity rainfall check portion.

FIG. 4 shows an example of the check by the low sensitivity rainfall check portion 5. If a quantity of receipt of a light is decreased by 15% to reach 510 or less within 30 sec after a time that the quantity of receipt of a light is 600, it is detected that a raindrop (a waterdrop) adheres and a rainfall signal is output to the wiper control portion 10.

The raindrop is detected at a great interval of 30 sec and wiping is also started slowly.

When the low sensitivity rainfall check portion 5 is selected, the rainfall situation check portion 3 does not detect the rainfall. Therefore, the wiper W can be prevented from being repeatedly driven based on a result of the check by the rainfall situation check portion 3.

Figure 5:
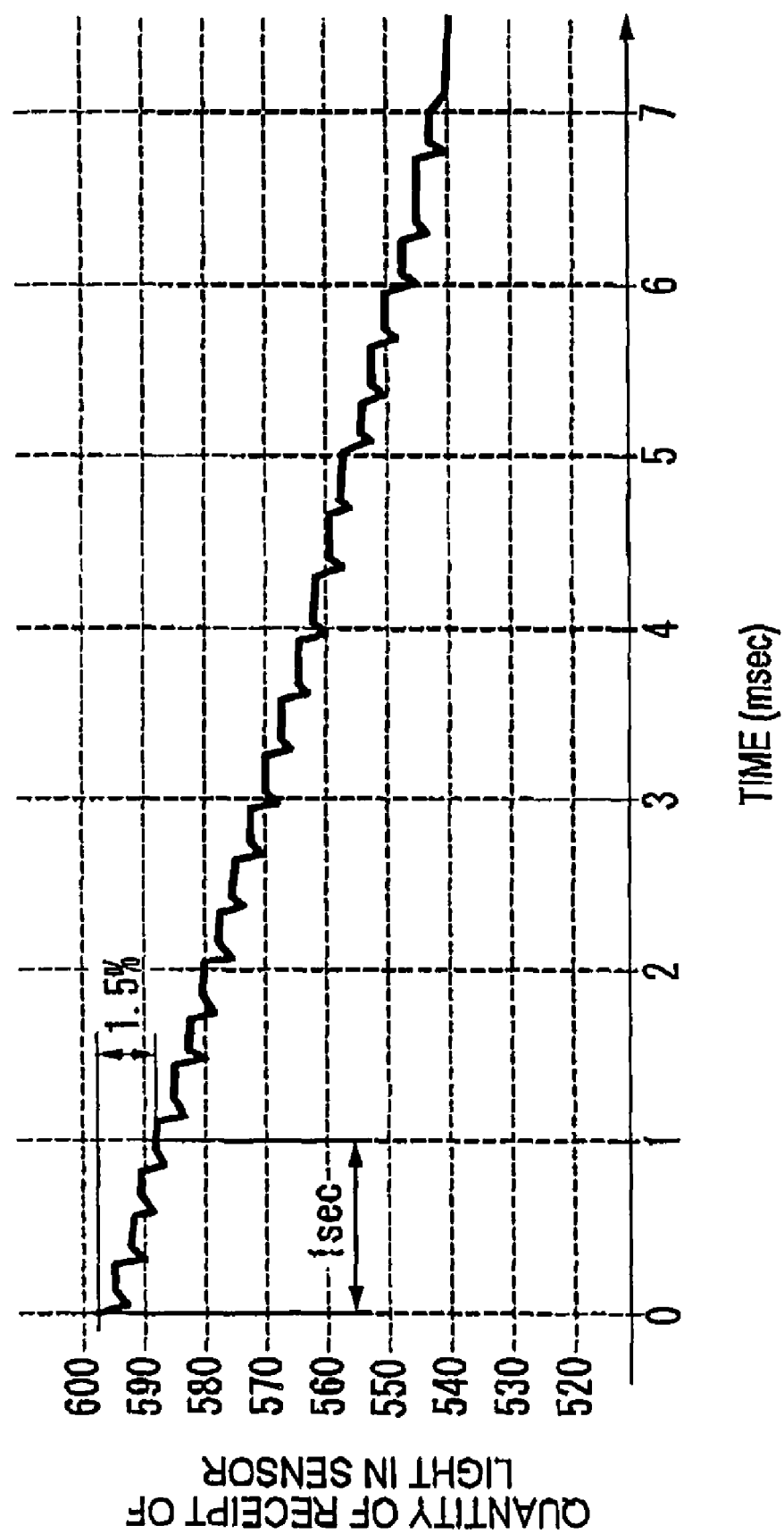
FIG. 5 is a chart showing an example of a result of the check by a high sensitivity rainfall check portion.
Figure 6:
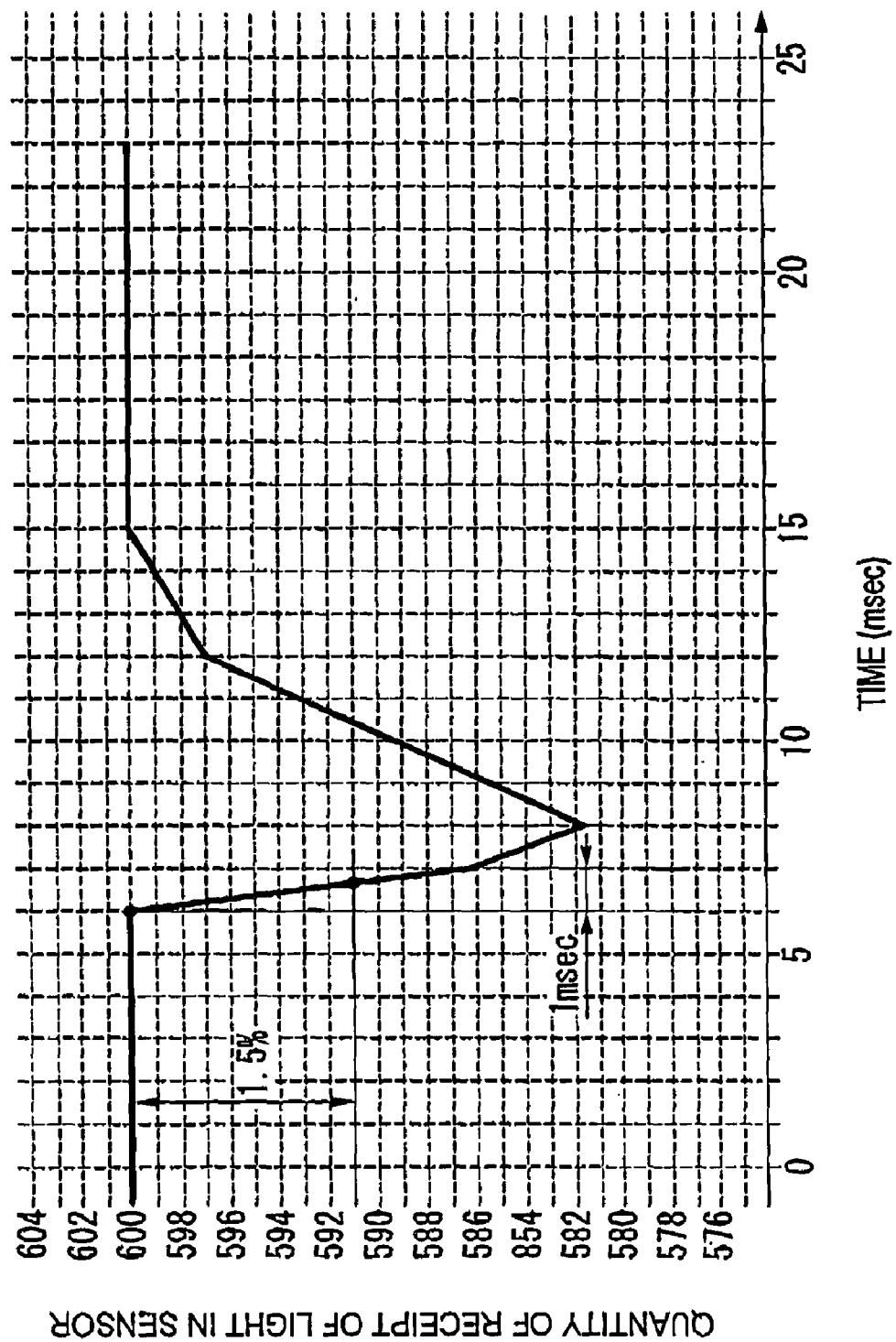
FIG. 6 is a chart showing a change in a light reflected by a detecting surface in the case in which a raindrop adheres to a raindrop detecting surface.

An axis of ordinate in FIG. 4 indicates a quality of receipt of a light which is obtained by A/D converting an output of a light receiving device. FIGS. 5 and 6 are set in the same manner.

On the other hand, when the ambient temperature is equal to or higher than the first set value (20° C.) in the check of the Step 100, the external surface temperature of the windshield S is equal to or higher than the second set value (25° C.) in the check of the Step 101, the rise in the temperature of the windshield S is equal to or higher than the third set value (20° C.) in the check of the Step 102 or the rainfall situation is "rainfall" in the check of the Step 103, the processing proceeds to Step 107.

At the Step 107, the weather condition check portion 9 determines that there is no possibility for the occurrence of the condensation over the windshield S, and outputs a "rain condition" signal to the wiper control portion 10.

At subsequent Step 108, the wiper control portion 10 selects the high sensitivity rainfall check portion 4 corresponding to the "rain condition" and reads a result of the check.

At Step 109, then, the wiper W is controlled with a high sensitivity in accordance with a result of the check by the high sensitivity rainfall check portion 4 in addition to a result of the check by the rainfall situation check portion 3.

Referring to a result of the check by the high sensitivity rainfall check portion 4, the change in the quantity of receipt of a light is observed at an interval of 1 sec as described above.

Since a drizzle has a small waterdrop, it is hard to detect each drop. On the other hand, the drizzle features to densely adhere to the windshield. As shown in FIG. 5, the quantity of receipt of a light is wholly reduced while repeating a much smaller rapid decrease than an ordinary raindrop and a slight return.

If the quantity of receipt of a light has a decrease of 1.5% or more for 1 sec, the raindrop is detected. Therefore, the drizzle can also be determined as a rainfall state quickly.

The rainfall situation check portion 3 reads the quantity of receipt of a light at an interval of 500 μsec and observes a change at an interval of 1 msec. Consequently, the ordinary raindrop which is changed rapidly for 2 msec with a decrease of approximately 3% as shown in FIG. 6 is reliably checked with a threshold of 1.5%, for example.

In FIGS. 4, 5 and 5, for easy understanding, time bases are different from each other.

By the control, when all of the four conditions are met, that is, the ambient temperature is lower than 20° C., the external surface temperature of the windshield S is lower than 25° C., the difference (the raised temperature) between the ambient temperature and the external surface temperature of the windshield S is lower than 20° C. and the rainfall state is not brought, it is determined that the condensation might occur over the windshield S so that the low sensitivity wiping is selected and the wiping is slowly carried out by setting, as a threshold, a decrease of 15% in the quantity of receipt of a light. Therefore, a driver can be prevented from feeling troublesome due to the actuation of the wiper W before recognizing the condensation.

If at least one of the four conditions is not met, there is no possibility that the condensation might occur and the high sensitivity wiping is selected. When a raindrop adheres to the windshield S, therefore, the wiping operation is rapidly carried out by setting, as a threshold, the decrease of 1.5% in the quantity of receipt of a light so that the driver can be prevented from being stressful.

In the embodiment, a structure in which a temperature detected by the temperature sensor 16 immediately after the ON operation of the ignition switch IG is set to be the ambient temperature in the first temperature check portion 7 forms ambient temperature detector according to the invention, and a structure in which a temperature detected by the temperature sensor 16 every certain time after the ON operation of the ignition switch IG is set to be the external surface temperature of the windshield S in the second temperature check portion 8 forms surface temperature detector.

In the embodiment, the above structure is employed and there are provided the raindrop detecting portion 2 for optically detecting a raindrop adhering to the windshield S of a vehicle, the high sensitivity rainfall check portion 4 for checking a rainfall state with a high sensitivity based on an output of the raindrop detecting portion 2, the low sensitivity rainfall check portion 5 for checking the rainfall state with a low sensitivity based on the output of the raindrop detecting portion 2, the first temperature check portion 7 for determining whether the ambient temperature T1 is lower than 20° C. or not, the second temperature check portion 8 for determining whether the external surface temperature T2 of the windshield S is lower than 25° C. or not and whether the difference (T2−T1) between the ambient temperature and the external surface temperature of the windshield S is lower than 20° C. or not, the weather condition check portion 9 for determining whether the condition that the condensation occurs over the windshield S is met or not based on a result of the check by the first temperature check portion 7 and a result of the check by the second temperature check portion 8, and the wiper control portion 10 for controlling a driving operation of the wiper W based on a rainfall state checked by the low sensitivity rainfall check portion 5 when a condition that the condensation occurs over the windshield S is met and for controlling the driving operation of the wiper W based on the rainfall state checked by the high sensitivity rainfall check portion 4 when the condition that the condensation occurs is not met on the basis of a result of the check by the weather condition check portion 9. Therefore, it is possible to prevent the condensation over the external surface of the windshield S from being unnecessarily wiped away while ensuring to wipe a raindrop on the windshield S away with a high sensitivity.

Furthermore, there is provided the rainfall situation check portion 3 for checking a basic rainfall state in which a raindrop having a typically predetermined size falls. When the rainfall situation check portion 3 checks the rainfall, the weather condition check portion 9 checks that the condition for the occurrence of the condensation over the windshield S is not met. Therefore, the wiper W is immediately controlled based on a result of the check by the high sensitivity rainfall check portion 4 without investigating other conditions for the occurrence of the condensation if the rainfall state is brought. Thus, responsiveness can be enhanced.

The temperature detected immediately after the ON operation of the ignition switch IG through the temperature sensor 16 provided in the raindrop detecting portion 2 is set to be the ambient temperature, and furthermore, the temperature detected by the temperature sensor 16 every certain time after the ON operation of the ignition switch IG is set to be the external surface temperature of the windshield S. Therefore, dedicated temperature sensors are not required respectively and a cost can be reduced. In addition, it is possible to acquire an accurate temperature.

Although the temperature sensor 16 provided in the raindrop detecting portion 2 is used as the ambient temperature detector and the surface temperature detector in the example, it is also possible to use an ambient temperature sensor of an air conditioner, a dedicated ambient temperature sensor and a dedicated surface temperature sensor, respectively.

According to the invention, the driving operation of the wiper is controlled based on a result of the check of the low sensitivity rainfall on the condition that the condensation occurs over the windshield while ensuring to wipe the raindrop on the windshield away with a high sensitivity. Therefore, it is possible to prevent the condensation over the external surface of the windshield from being unnecessary wiped away.

The invention is not limited to the foregoing embodiments but various changes and modifications of its components may be made without departing from the scope of the present invention. Also, the components disclosed in the embodiments may be assembled in any combination for embodying the present invention. For example, some of the components may be omitted from all the components disclosed in the embodiments. Further, components in different embodiments may be appropriately combined.

What is claimed is:

1. An autowiper controller comprising:
   a raindrop detecting portion for optically detecting a raindrop adhering to a windshield of a vehicle;
   a high sensitivity rainfall check portion for checking a rainfall state with a high sensitivity based on an output of the raindrop detecting portion;
   a low sensitivity rainfall check portion for checking the rainfall state with a low sensitivity based on the output of the raindrop detecting portion;
   ambient temperature detector for detecting an ambient temperature;
   surface temperature detector for detecting an external surface temperature of the windshield;
   a first temperature check portion for determining whether the ambient temperature is lower than a first set value or not;
   a second temperature check portion for determining whether the external surface temperature of the windshield is lower than a second set value or not and whether a difference between the ambient temperature and the external surface temperature of the windshield is smaller than a third set value or not;
   a weather condition check portion for determining whether a condition that condensation occurs over the windshield is met or not based on a result of the check by the first temperature check portion and a result of the check by the second temperature check portion; and a wiper control portion for controlling a driving operation of a wiper based on a rainfall state checked by the low sensitivity rainfall check portion when the condition that the condensation occurs over the windshield is met, and for controlling the driving operation of the wiper based on the rainfall state checked by the high sensitivity rainfall check portion when the condition that the condensation occurs is not met on the basis of a result of the check by the weather condition check portion.

2. The autowiper controller as set forth in claim 1,
wherein the weather condition check portion determines that the condition for the occurrence of the condensation over the windshield is not met, when a rainfall situation check portion for checking a basic rainfall state determines a rainfall.

3. The autowiper controller as set forth in claim 1, further comprising:

a temperature sensor attached to the windshield, wherein the ambient temperature detector sets, as the ambient temperature, a temperature detected by the temperature sensor immediately after an ON operation of an ignition switch.

4. The autowiper controller as set forth in claim 3, wherein the surface temperature detector sets, as the external surface temperature of the windshield, a temperature detected by the temperature sensor every certain time after the ON operation of the ignition switch.

\* \* \* \* \*